UNITED STATES PATENT OFFICE 2,628,181

TREATING PLANTS WITH 4,5 DICHLORO-3-PYRIDAZONES

David T. Mowry, Dayton, Ohio, assignor to Monsanto Chemical Company, St. Louis, Mo., a corporation of Delaware No Drawing. Application April 13, 1949, Serial No. 87,370

3 Claims. (Cl. 167—33)

This invention relates to new chemical compounds useful as bactericides and fungicides. More specifically the invention relates to chlorine substituted pyridazones and homologues thereof having unusual biocidal activity.

The primary purpose of this invention is to provide a new and more effective method of combating fungi and bacteria injurious to plant and animal life. A further purpose of this invention is to provide new chemical compositions, the chlorine substituted pyridazones, for use as fungistats and bacteristats. A still further purpose of this invention is to provide a method for the preparation of new compounds having unusual utility.

It has been found that chlorine substituted pyridazones are useful in destroying or inhibiting the growth or fungi and bacteria. Suitable compounds are those having the structural formula:

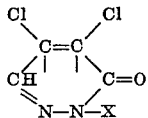

wherein X is a radical of the group consisting of hydrogen, alkyl, phenyl and chlorophenyl.

The new chemical compounds are prepared from mucochloric acid by reaction of a salt of semicarbazide or a hydrazine, such as phenylhydrazine, chlorophenylhydrazine, methyl hydrazine, and other alkyl hydrazines, particularly those having up to five carbon atoms. The reactions are conducted in aqueous solution or in aqueous alcohol solutions. During the reaction the addition products separate as relatively insoluble precipitates, which may readily be removed from the reaction mass by conventional filtration procedures. The addition products are then heated, for example in glacial acetic acid solution, and the desired pyridazones separated from the reaction mass.

The new chemical compounds may be used alone or in mixtures with other solid substances, for example lime, sulfur, talc, bentonite, pumice, silica, gypsum, fuller's earth, diatomaceous earth, clay, chalk, kaolin, attapulgite, floridin and other chemically inert solids capable of being prepared in finely divided form, which other substances may also be active as fungistats or bacteristats. If desired the new substances may be used in solution in suitable organic solvents or in aqueous emulsions in which various other liquid and solid components may be included, for example adhesives and wetting agents, thereby improving contacting properties and the adherence of the compositions to plant or animal tissues.

Further details of the synthesis of the new chemical compounds and their uses are set forth with respect to the following specific examples.

Example 1

A reaction flask was charged with 126 grams of mucochloric acid, 84 grams of semicarbazide hydrochloride and sufficient fifty percent alcohol to form a clear solution. The reaction mass was then treated with 52 grams of potassium carbonate. A heavy precipitate which was thereby formed was removed by filtration and dried. This compound, the semicarbazone of mucochloric acid was added slowly to 300 cc. of glacial acetic acid while continuously stirred at 100 to 110° C. The compound dissolved with evolution of carbon dioxide. As soon as the reaction had subsided the reaction mass was diluted with warm water, cooled and the resulting precipitate removed by filtration. The resulting product was a mass of fine prismatic needles having a melting point of 202° C. This product was identified as 4,5-dichloro-3-pyridazone.

The compound described in the preceding paragraph was found to prevent the growth of *Mycobacterium tuberculosis* at a concentration of 200 parts per million. It was also found to be an effective inhibitor with respect to the fungus Pythium at a concentration of 70 parts per million.

Example 2

A flask was charged with 500 cc. of water, 40 grams of sodium carbonate and 126 grams of mucochloric acid. The solution so prepared was mixed with a solution of 108 grams of phenylhydrazine hydrochloride in 1000 ml. of water. The heavy yellow precipitate which formed immediately was filtered and dried. This mucochloric acid phenylhydrazine was dissolved in 300 cc. of glacial acetic acid and heated at the reflux temperature for ten minutes. After adding a little warm water to the reaction mass it was cooled to room temperature. A crystalline product which was formed during the cooling was filtered and dried. The product, after recrystallization from dilute alcohol, was in the form of flat white prisms and had a melting point of 164° C. The compound was identified as 2-phenyl-4,5-dichloro-3-pyridazone.

The compound described in the preceding paragraph was found to be completely fungistatic at a concentration of 40 parts per million, giving zero percent germination of Stemphyllium spores. At a concentration of 20 parts per million ten percent germination of Stemphyllium spores was observed.

The invention is defined by the following claims.

I claim:

1. A method of treating plant tissue for inhibiting the growth of fungi and bacteria which comprises contacting the said tissue with a compound of the structural formula:

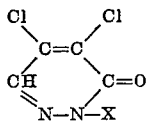

wherein X is a radical of the group consisting of hydrogen, alkyl, phenyl and chlorophenyl.

2. A method of treating plant tissue for inhibiting the growth of fungi and bacteria which comprises contacting the said tissue with 4,5-dichloro-3-pyridazone.

3. A method of treating plant tissue for inhibiting the growth of fungi and bacteria which comprises contacting the said tissue with 2-phenyl-4,5-dichloro-3-pyridazone.

DAVID T. MOWRY.

REFERENCES CITED

The following references are of record in the file of this patent:

Webster's International Dictionary, 1939 edition, page 1194.

Bistrzycki et al.: Ber. Deut. Chem. 34, 1012–1014 (1901).

Beilstein: Vierte Auflage, volume 3, pages 727 to 728.